United States Patent Office 2,758,969
Patented Aug. 14, 1956

2,758,969

FOAM-FORMING COMPOSITION

Joseph M. Perri and David Y. Dollman, West Chester, Pa., assignors to National Foam System, Inc., West Chester, Pa., a corporation of Delaware No Drawing. Application December 31, 1954, Serial No. 479,214

2 Claims. (Cl. 252—3)

This invention relates generally to fire-extinguishing compositions and more particularly to such compositions as are capable, when combined with water and air, of producing a stabilized foam which is nonsupporting of combustion and serves as a blanket to smother and extinguish fires of flammable liquids, including particularly those of the oxygen-containing polar solvent type such as are principally represented by alcohols, esters, ketones and ethers and which are noted for their ability to destroy upon contact mechanical (air) foam produced with the use of foam-forming compositions heretofore known. This application is a continuation in part of our copending application Serial No. 225,464, filed May 9, 1951, and now abandoned.

While heretofore and prior to the present invention, various foam-forming compositions have been successfully employed to produce mechanical or air foam for the extinguishment of oil and gasoline fires, experience has demonstrated that such foam is totally ineffective as an extinguisher of such fires as are produced by burning alcohols, esters, ketones, ethers, acetones and other such combustible organic liquids of high capillary characteristics. Despite the fact that a suitable stabilizer composition has been heretofore developed primarily for the production of chemical foam adequate for extinguishing fires of organic liquids of the kind above referred to, such as the composition described in United States Letters Patent No. 2,269,426, granted January 13, 1942, to Fisher L. Boyd, there has always existed the need for a foam-forming composition which is correspondingly adequate for the production of mechanical foam capable of extinguishing fires of organic liquids having high capillary characteristics.

Having in mind the foregoing, it is among the objects of the present invention to provide a foam-forming composition primarily suitable for the production of mechanical foam which is highly effective as an extinguisher of alcohol fires and the like; which, when employed in the production of mechanical foam, results in a foam which is not destructively affected by alcohol and other such organic liquids and which will float freely upon the surface thereof in such quantities as to provide an effective fire smothering blanket of foam; and which is adapted to be handled in exactly the same manner and by the same apparatus as is conventionally employed in connection with the production of mechanical foam ordinarily used for extinguishing oil and gasoline fires.

Other objects and advantages of the present invention will be apparent more fully hereinafter.

Ordinary mechanical foam as generally employed for the extinguishment of oil and gasoline fires, when applied to an alcohol or other organic liquid fire, almost immediately sinks to the bottom of such liquid at the same time that a large proportion of the foam is more or less completely disintegrated and broken up, due to the action of such liquid on the foam. This tendency for the foam to disintegrate upon contact with alcohol and other organic liquids of high capillary characteristics is overcome by providing a foam-forming solution which, when introduced into a flowing stream of water and admixed with air to produce mechanical or air foam, results in the formation of air-filled foam bubbles the walls of which are coated in continuous phase with a solid film of a water-insoluble heavy metal soap, thereby stabilizing the foam against the destructive action of liquids of the oxygen-containing polar solvent type. Preferably, in accordance with the present invention, the foam-forming solution is such as to produce an air-filled bubble the wall of which is formed of a continuous film of a water insoluble aluminum soap.

In order that the foam-forming liquid be satisfactory for the mechanical production of fire-extinguishing foam, it is desirable that it be homogeneous, clear and free of all suspended matter and that it be capable of use with standard devices and apparatus conventionally employed in the production of foam. To these ends, the foam-forming solution of the present invention is prepared as will now be described, it being understood, of course, that the invention is not limited to the exact ingredients and proportions named and that variations from the same are possible without departing from the principles or real spirit of the invention.

In producing the foam-forming solution of the present invention, there is initially prepared a solution of the following formula:

*Solution A*

| | |
|---|---|
| Stearic acid, or equivalent | 8.5 lbs. approximately |
| Isopropyl alcohol, or equivalent | 2.5 gals. approximately |
| Chloroform, or equivalent | 2.5 gals. approximately |
| Triethanolamine, or equivalent | 13 lbs. approximately |
| Monoethanolamine, or equivalent | 2.0 gals. approximately |
| Water | 1.25 gals. approximately |

In the preparation of the foregoing Solution A, the stearic acid is dissolved in the alcohol and chloroform and to this solution is added the triethanolamine contained in the specified water. Finally, the 2 gallons of monoethanolamine (equivalent to approximately 17 pounds) is added.

As equivalents of the stearic acid there can be used palmitic acid, oleic acid and other related fatty acids, while as equivalents for the isopropoyl alcohol there may be used methanol or ethanol. Any of the related chlorinated hydrocarbons may be used in lieu of the chloroform, such as carbon tetrachloride and tri-chlorethylene. Diethanolamine may be substituted for the triethanolamine and/or the monoethanolamine, and in place of these ethanolamines one may use ethylene diamine, or equivalents.

A second solution in a separate vessel is then prepared for admixture with Solution A, which second solution is of the following formula:

*Solution B*

| | |
|---|---|
| Glacial acetic acid, or equivalent | 1.75 gals. approximately |
| Water | 8.5 gals. approximately |
| Sodium carbonate monohydrate | 4.25 lbs. approximately |
| Aluminum Lactate, or equivalent | 7.0 lbs. approximately |

In the preparation of said Solution B, the glacial acetic acid (or its equivalent, lactic acid) is added to the water to produce an aqueous solution into which the sodium carbonate monohydrate is slowly added with constant stirring until a clear solution is obtained. To this clear solution is added the aluminum lactate or other soluble heavy metal salts of organic acids, which solution is thereupon heated to boiling temperature and then allowed to cool to 100° F. In Solution B, in place of the aluminum lactate, one may utilize aluminum gluconate, ferrous lactate, or ferrous gluconate, or other equivalent salts. The acetic acid and sodium carbonate of Solution B may be omitted if desired, since they are not active ingredients in the composition, being present only for the purpose of facilitating the mixing of the other ingredients.

Solution B, when thus cooled to 100° F., is added to Solution A and thoroughly mixed therewith by constant stirring, and to this mixture is then added an isopropanol solution of coconut fatty acids (e. g. myristic acid or lauric acid or a mixture thereof) separately prepared by dissolving approximately 64.5 lbs. of the fatty acid in approximately 4.5 gallons of the isopropanol. The resultant solution of approximately 32 gallons constitutes the foam-forming solution of the present invention. As has been indicated above, the quantities of the ingredients used in the preparation of the final solution are not critical and may be varied within a range of as much as ten per cent above and below the amounts stated above by way of example.

It is to be understood that the chloroform (or equivalent), alcohol, and water are present in the foregoing solutions and resultant formulation solely as an inert solvent vehicle, and they do not play any significant part in foam production, except to afford a homogeneous solution of the various active components. Accordingly, it is apparent that any solvent or combination of solvents may be employed within the scope of the present invention, which are inert to the various active ingredients and generally appropriate for the present purposes.

The foam-forming solution as prepared in accordance with the present invention is employed in the proportion of from three to nine per cent by volume of the water with which it is admixed to produce mechanical or air foam of maximum volume and the requisite stability and permanency to extinguish fires of all flammable liquids including especially those of the oxygen-containing polar solvent type. To demonstrate and prove the effectiveness of the foam-forming solution of the present invention, a fire-extinguishing test was conducted upon 100 gallons of burning 100% methanol contained in a standard test tank presenting an exposed surface area of 100 sq. ft. After the alcohol had been ignited and permitted to burn freely for 1 minute, mechanical foam was applied to the flaming surface through a foam nozzle of the pick-up type having a discharge rate of 6 gallons of water per minute and which operated to introduce 0.08 gallon of the foam-forming solution into the water stream per gallon of the water, producing a 6 per cent aqueous solution of the foam-forming liquid. The resultant foam blanketed the fire and brought it effectively under control in two minutes, with complete extinguishment of the fire in 2.8 minutes. The rate of water application in this test, to wit, 0.06 G. P. M. per sq. ft., is only 60% of that recommended generally for foam application.

By way of comparing the performance of the present foaming liquid with that of heretofore available foaming liquids, the above test was repeated using a protein base liquid for producing mechanical foam. It was observed that the foam produced with the latter liquid was immediately destroyed upon contact with the alcohol and that even when the rate of foam application was increased to three times the normal test rate, i. e. to 0.18 G. P. M. per sq. ft., the foam was still not effective to extinguish the flames of the alcohol fire.

The essence of the present invention resides in the preparation of a foam forming liquid as above described wherein its contained soluble amine soaps in combination with solubilized aluminum or other heavy metal salts of organic liquids, such as the aluminum lactate above referred to, these ingredients being preferably combined with alcohol and chloroform to provide a clear, homogeneous solution having a low freezing point and which is effective as a foam-former even when introduced into water of extremely low temperature.

The amine soaps present in the solution are obtained by reaction of the coconut fatty acids (such as have 14 or less carbon atoms) with the amines, as well as by reaction of the stearic and equivalent fatty acids having more than 14 carbon atoms with the amines, the soap of the first-mentioned reaction serving primarily as the foam-forming agent, while that of the second-mentioned reaction functions primarily as the foam-stabilizing agent. The organic acid heavy metal salt (e. g. aluminum lactate) exists as such in the solution without reaction with the amine soaps until such time as the solution, which is of hydrophilic character, is introduced into the water stream and admixed with air to form foam, at which time the organic acid heavy metal salt reacts, in the presence of the water, with a certain amount of the fatty acid soap to form a water-insoluble heavy metal soap which envelops the foam bubbles to provide each with a continuous-phase surface film of insoluble solids impervious to destruction by alcohol and other liquids of high capillary characteristics. Thus, when the hydrophilic solution of the present invention includes aluminum lactate as the organic acid heavy metal salt constituent thereof and is introduced into water to form foam, the aluminum component of such salt reacts with a sufficient amount of fatty acid soap present in the solution to form a water-insoluble aluminum soap, while at the same time the lactate component of the salt combines with the remainder portion of the amines present in the solution for dissolution in the water stream.

What is claimed is:

1. A foam forming liquid solution adapted for use in the production of mechanical fire-extinguishing foam consisting essentially of: an amine-fatty acid foam forming soap wherein the amine is a mixture of mono- and tri-ethanolamine and the fatty acid is a mixture of stearic and myristic acids, aluminum lactate, and a solvent medium for the foregoing components of water, isopropyl alcohol, and chloroform, providing a clear homogeneous solution; the foregoing components being present in the approximate quantity relationship of 13 pounds tri-ethanolamine, 2.0 gallons mono-ethanolamine, 8.5 pounds stearic acid, 64.5 pounds myristic acid, 7.0 pounds aluminum lactate, 7 gallons isopropyl alcohol, 2.5 gallons chloroform, and 9.75 gallons water.

2. A foam forming liquid solution adapted for use in the production of mechanical fire-extinguishing foam consisting essentially of: an amine-fatty acid foam forming soap wherein the amine component is a mixture of mono- and tri-ethanolamine and the fatty acid component is a mixture of stearic acid and myristic acid, a salt chosen from the group consisting of aluminum lactate and ferrous lactate, and a solvent medium for the foregoing of water, isopropanol and chloroform; the foregoing being present in the approximate quantity relationship of 13 pounds tri-ethanolamine, 2.0 gallons mono-ethanolamine, 8.5 pounds stearic acid, 64.5 pounds myristic acid, 7.0 pounds lactate salt, 7 gallons isopropanol, 2.5 gallons chloroform, and 9.75 gallons water.

References Cited in the file of this patent

UNITED STATES PATENTS

| | | |
|---|---|---|
| 1,707,597 | Blenio | Apr. 2, 1929 |
| 2,165,997 | Daimler et al. | July 11, 1939 |
| 2,196,042 | Timpson | Apr. 2, 1940 |
| 2,212,470 | Friedrich | Aug. 20, 1940 |
| 2,405,538 | White | Aug. 6, 1946 |
| 2,748,078 | Perri et al. | May 29, 1956 |